(12) United States Patent
Song et al.

(10) Patent No.: US 11,943,026 B2
(45) Date of Patent: Mar. 26, 2024

(54) METHOD FOR OBTAINING CHANNEL STATE INFORMATION, APPARATUS, AND COMPUTER STORAGE MEDIUM

(71) Applicant: HUAWEI TECHNOLOGIES CO., LTD., Guangdong (CN)

(72) Inventors: Zhaohong Song, Dongguan (CN); Dagang Zhang, Dongguan (CN); Ji Xia, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 377 days.

(21) Appl. No.: 17/325,865

(22) Filed: May 20, 2021

(65) Prior Publication Data

US 2021/0273710 A1 Sep. 2, 2021

Related U.S. Application Data

(63) Continuation of application No. PCT/CN2018/117452, filed on Nov. 26, 2018.

(51) Int. Cl.
*H04B 7/06* (2006.01)
*H04L 5/00* (2006.01)
*H04W 72/0453* (2023.01)
*H04W 28/02* (2009.01)

(52) U.S. Cl.
CPC ......... *H04B 7/0626* (2013.01); *H04L 5/0051* (2013.01); *H04W 72/0453* (2013.01); *H04W 28/0268* (2013.01); *H04W 28/0278* (2013.01)

(58) Field of Classification Search
CPC ... H04B 7/0626; H04L 5/0051; H04L 5/0094; H04L 5/0096; H04W 72/0453; H04W 28/0268; H04W 28/0278; H04W 72/542
See application file for complete search history.

(56) References Cited

U.S. PATENT DOCUMENTS

2018/0212711 A1* 7/2018 Zhu ................. H04L 1/0026

FOREIGN PATENT DOCUMENTS

| CN | 103687025 A | 3/2014 |
|---|---|---|
| CN | 106411492 A | 2/2017 |
| CN | 108282285 A | 7/2018 |

(Continued)

OTHER PUBLICATIONS

EPO Partial Supplementary European Search Report issued in European Application No. 18941207.5 dated Oct. 21, 2021, 14 pages.

(Continued)

*Primary Examiner* — Dady Chery
(74) *Attorney, Agent, or Firm* — Fish & Richardson P.C.

(57) ABSTRACT

The present disclosure relates to methods for obtaining channel state information (CSI), apparatus, and computer storage medium. One example method includes allocating, by a network device to a terminal device according to a preset rule, a transmission resource for transmitting a sounding reference signal (SRS) in a cell to which the terminal device belongs. Transmission resources for transmitting SRSs in different cells do not overlap at all or partially overlap. The network device receives the SRS transmitted by the terminal device on the allocated transmission resource, and performs channel quality estimation based on the received SRS to obtain CSI.

19 Claims, 2 Drawing Sheets

(56) References Cited

FOREIGN PATENT DOCUMENTS

| | | |
|---|---|---|
| CN | 108737051 A | 11/2018 |
| WO | 2013127978 A1 | 9/2013 |
| WO | 2014019173 A1 | 2/2014 |
| WO | 2017003962 A1 | 1/2017 |

OTHER PUBLICATIONS

Office Action issued in Chinese Application No. 201880099656.X dated Jul. 1, 2022, 12 pages.
3GPP TS 36.211 V15.3.0 (Sep. 2018), "3rd Generation Partnership Project; Technical Specification Group Radio Access Network; Evolved Universal Terrestrial Radio Access (E-UTRA); Physical channels and modulation (Release 15)," Sep. 2018, 237 pages.
PCT International Search Report and Written Opinion in International Application No. PCT/CN2018/117452, dated Aug. 15, 2019, 20 pages.

* cited by examiner

METHOD FOR OBTAINING CHANNEL STATE INFORMATION, APPARATUS, AND COMPUTER STORAGE MEDIUM

CROSS-REFERENCE TO RELATED APPLICATIONS

This application is a continuation of International Application No. PCT/CN2018/117452, filed on Nov. 26, 2018, the disclosure of which is hereby incorporated by reference in its entirety.

TECHNICAL FIELD

This application relates to the field of communication technologies, and in particular, to a method for obtaining channel state information, an apparatus, and a computer storage medium.

BACKGROUND

A reference signal sent by a terminal device to a network device may be a sounding reference signal (SRS), and the SRS is used by the network device to perform related measurement on an uplink send channel of the terminal device. For example, the network device may estimate uplink channel quality by measuring the SRS, to perform uplink adaptive modulation and coding (AMC), uplink frequency selective scheduling, measurement on uplink timing of the terminal device, and calculation of a downlink beamforming weight.

In a plurality of cells, due to signal interference between different cells, SRS interference is severe in an area in which signals of the different cells overlap. Consequently, SRS measurement is inaccurate, channel quality of the cell severely deteriorates, and beamforming (BF) performance, beam selection of uplink and downlink scheduling of the cell, SRS power control, multi-user pairing determining accuracy, and the like are affected. Finally, cell performance is affected.

SUMMARY

Embodiments of this application provide a method for obtaining channel state information, an apparatus, and a computer storage medium, to reduce inter-cell SRS interference and improve cell performance.

According to a first aspect, an embodiment of this application provides a method for obtaining channel state information. A network device allocates, to a terminal device according to a preset rule, a transmission resource for transmitting an SRS in a cell to which the terminal device belongs. Transmission resources for transmitting SRSs in different cells do not overlap at all or partially overlap, and the transmission resource includes a time domain resource, a frequency domain resource, a carrier domain resource, or a code domain resource. The network device receives the SRS transmitted by the terminal device on the allocated transmission resource, and the network device performs channel quality estimation based on the received SRS to obtain channel state information (CSI).

In this technical solution, the transmission resources for transmitting the SRSs in the different cells do not completely overlap, thereby ensuring that the transmission resources allocated by the network device to the different cells are staggered as much as possible. Therefore, SRS interference between the cells can be reduced, and cell performance can be improved.

In an implementation, the allocating, by a network device to a terminal device according to a preset rule, a transmission resource for transmitting an SRS in a cell to which the terminal device belongs includes: determining a quantity of cells in which the transmission resource needs to be currently allocated; and allocating, to the terminal device based on the quantity of cells, the transmission resource for transmitting the SRS in the cell to which the terminal device belongs.

In an implementation, the allocating, by the network device to the terminal device based on the quantity of cells, the transmission resource for transmitting the SRS in the cell to which the terminal device belongs includes: dividing a physical cell identifier (PCI) of the cell to which the terminal device belongs by the quantity of cells, to obtain a remainder; determining, based on the remainder, the cell to which the terminal device belongs as a target cell; and allocating, to the terminal device, the transmission resource for transmitting the SRS in the target cell. The target cell is a first cell, a second cell, or a third cell. The first cell is a cell for which the remainder obtained by dividing the PCI by the quantity of cells is a first value. The second cell is a cell for which the remainder obtained by dividing the PCI by the quantity of cells is a second value. The third cell is a cell for which the remainder obtained by dividing the PCI by the quantity of cells is a third value. A transmission resource for transmitting an SRS in the first cell, a transmission resource for transmitting an SRS in the second cell, and a transmission resource for transmitting an SRS in the third cell do not overlap at all or partially overlap.

In an implementation, the determining, by the network device, a quantity of cells in which the transmission resource needs to be currently allocated includes: determining a quantity of intra-frequency neighboring cells, where the intra-frequency neighboring cells include the cell to which the terminal device belongs, and the intra-frequency neighboring cells have a same spectrum.

In an implementation, the allocating, by the network device to the terminal device based on the quantity of cells, the transmission resource for transmitting the SRS in the cell to which the terminal device belongs includes: dividing a PCI of the cell to which the terminal device belongs by the quantity of cells, to obtain a remainder; determining, based on the remainder, the cell to which the terminal device belongs as a target cell; and allocating, to the terminal device, the transmission resource for transmitting the SRS in the target cell. The target cell is a first cell, a second cell, or a third cell. The first cell is a cell for which the remainder obtained by dividing the PCI by the quantity of cells is a first value. The second cell is a cell for which the remainder obtained by dividing the PCI by the quantity of cells is a second value. The third cell is a cell for which the remainder obtained by dividing the PCI by the quantity of cells is a third value. A transmission resource for transmitting an SRS in the first cell is a first sub-band or a second sub-band. A transmission resource for transmitting an SRS in the second cell is the second sub-band or a third sub-band. A transmission resource for transmitting an SRS in the third cell is the third sub-band or a fourth sub-band.

In an implementation, the allocating, by the network device to the terminal device based on the quantity of cells, the transmission resource for transmitting the SRS in the cell to which the terminal device belongs includes: dividing a PCI of the cell to which the terminal device belongs by the quantity of cells, to obtain a remainder; determining, based on the remainder, the cell to which the terminal device belongs as a target cell; and allocating, to the terminal device, the transmission resource for transmitting the SRS in the target cell. The target cell is a fourth cell or a fifth cell. The fourth cell is a cell for which the remainder obtained by dividing the PCI by the quantity of cells is a first value. The fifth cell is a cell for which the remainder obtained by dividing the PCI by the quantity of cells is a second value. A transmission resource for transmitting an SRS in the fourth cell is a fifth sub-band or a sixth sub-band. A transmission resource for transmitting an SRS in the fifth cell is a seventh sub-band or an eighth sub-band. The fifth sub-band and the seventh sub-band are obtained based on a quantity of frequency domain resources included in a system bandwidth. A frequency of the fifth sub-band is less than a frequency of the seventh sub-band. The sixth sub-band is a part of the fifth sub-band, and the eighth sub-band is a part of the seventh sub-band.

In this embodiment of this application, an example in which the quantity of cells is 2 or 3 is used. When the quantity of cells is greater than 3, the rest may be deduced by analogy based on a system standard and the system bandwidth. Details are not described in this embodiment of this application again.

In an implementation, that transmission resources for transmitting SRSs in different cells do not overlap at all or partially overlap includes: time domain resources for transmitting the SRSs in the different cells do not overlap at all or partially overlap; in a part in which the time domain resources for transmitting the SRSs in the different cells completely overlap, frequency domain resources for transmitting the SRSs in the different cells do not overlap at all or partially overlap; in a part in which the frequency domain resources for transmitting the SRSs in the different cells completely overlap, carrier domain resources for transmitting the SRSs in the different cells do not overlap at all or partially overlap; and in a part in which the carrier domain resources for transmitting the SRSs in the different cells completely overlap, code domain resources for transmitting the SRSs in the different cells do not overlap at all or partially overlap.

In an implementation, the network device may further send first configuration information to the terminal device, where the first configuration information is used to indicate the terminal device to regularly transmit, based on a configuration periodicity, the SRS on the allocated transmission resource.

In an implementation, the network device may further send second configuration information to the terminal device, where the second configuration information is used to indicate that the transmission resource allocated to the terminal device is a resource other than a transmission resource corresponding to a periodically transmitted SRS in the system bandwidth.

In an implementation, when a quantity of users included in the cell to which the terminal device belongs or a type of a service that needs to be currently processed by the terminal device changes, the network device may further dynamically adjust the transmission resource allocated to the terminal device.

According to a second aspect, an embodiment of this application provides a method for obtaining channel state information. A network device determines a service that needs to be currently processed by a terminal device; determines, based on a correspondence between a service and a transmission resource for transmitting an SRS, a transmission resource corresponding to the service; allocates the transmission resource to the terminal device; receives the SRS transmitted by the terminal device on the allocated transmission resource; and performs channel quality estimation based on the received SRS to obtain CSI.

In this technical solution, the transmission resource required by the service is configured based on a service feature, and channel quality estimation does not need to be performed on a transmission resource that is not required by the service, so that the network device and the terminal device can use CSI of an air interface in a more timely manner, and the accurate CSI can be fully used during uplink and downlink scheduling, thereby improving spectral efficiency of a cell.

In an implementation, the determining, by the network device based on a correspondence between a service and a transmission resource for transmitting a sounding reference signal SRS, a transmission resource corresponding to the service includes: determining, based on indication information of the service that needs to be currently processed by the terminal device, a type of the service, where the indication information includes a quality of service class identifier (QCI) or a subscriber profile identifier (SPID) of the service; and determining, based on a correspondence between a type of a service and a transmission resource for transmitting an SRS, the transmission resource corresponding to the type of the service.

In an implementation, the determining, by the network device based on a correspondence between a type of a service and a transmission resource for transmitting an SRS, the transmission resource corresponding to the type of the service includes: when a latency requirement level of the service that needs to be currently processed by the terminal device is greater than a first-level threshold, determining that a configuration periodicity of the SRS is less than a preset periodicity threshold; and when the latency requirement level of the service that needs to be currently processed by the terminal device is less than or equal to the first-level threshold, determining that the configuration periodicity of the SRS is greater than or equal to the preset periodicity threshold.

In an implementation, the determining, by the network device based on a correspondence between a service and a transmission resource for transmitting an SRS, a transmission resource corresponding to the service includes: determining a service volume based on uplink send buffer data fed back by the terminal device or a downlink send buffer data volume; and determining, based on a correspondence between a service volume and a transmission resource for transmitting an SRS, the transmission resource corresponding to the service volume.

In an implementation, the determining, by the network device based on a correspondence between a service volume and a transmission resource for transmitting an SRS, the transmission resource corresponding to the service volume includes: when a frequency domain resource block resource requirement level of the service that needs to be currently processed by the terminal device is less than or equal to a second-level threshold, determining that a sub-band included in the transmission resource is less than or equal to a preset quantity threshold; and when the frequency domain resource block resource requirement level of the service that needs to be currently processed by the terminal device is greater than the second-level threshold, determining, by the network device, that the sub-band included in the transmission resource is greater than or equal to the preset quantity threshold.

In an implementation, when the service volume changes, the network device may further dynamically adjust the transmission resource allocated to the terminal device. A resource volume of an adjusted transmission resource is directly proportional to the service volume.

In an implementation, the network device may further send first configuration information to the terminal device, where the first configuration information is used to indicate the terminal device to regularly transmit, based on a configuration periodicity, the SRS on the allocated transmission resource.

In an implementation, the network device may further send second configuration information to the terminal device, where the second configuration information is used to indicate that the transmission resource allocated to the terminal device is a resource other than a transmission resource corresponding to a periodically transmitted SRS in a system bandwidth.

According to a third aspect, an embodiment of this application provides a communication apparatus, where the apparatus includes a unit configured to implement the method for obtaining channel state information according to the first aspect or the second aspect.

According to a fourth aspect, an embodiment of this application provides a computer storage medium, where the computer storage medium stores a computer program or instructions. When the program is executed or the instructions are executed by a processor, the processor is enabled to perform the method according to the first aspect or the second aspect.

According to a fifth aspect, an embodiment of this application provides a communication apparatus, including a processor, where the processor is coupled to a memory,
the memory is configured to store instructions, and
the processor is configured to execute the instructions in the memory, so that the communication apparatus performs the method according to the first aspect or the second aspect.

According to a sixth aspect, an embodiment of this application provides a chip system, where the chip system includes a processor and an interface circuit, the interface circuit is coupled to the processor,
the processor is configured to execute a computer program or instructions, to implement the method according to the first aspect or the second aspect, and
the interface circuit is configured to communicate with another module outside the chip system.

DESCRIPTION OF EMBODIMENTS

Embodiments of this application may be applied to a wireless communication system. The wireless communication system may be a new radio (NR) system in the 5th generation (5G) mobile communication system, or may be a future new wireless communication system. This is not limited in this application.

The embodiments of this application specifically relate to a network device and a terminal device. The network device is an access device used by the terminal device to access the mobile communication system in a wireless manner, and may be a NodeB, an evolved NodeB (eNodeB), a transmission reception point (TRP), a next generation NodeB (gNB) in the 5G mobile communication system, a base station in a future mobile communication system, an access node in a Wi-Fi system, or the like. A specific technology and a specific device form used by the network device are not limited in the embodiments of this application.

The terminal device may also be referred to as a terminal (Terminal), user equipment (UE), a mobile station (MS), a mobile terminal (MT), or the like. The terminal device may be a mobile phone, a tablet (Pad), a computer with a wireless transceiver function, a virtual reality (VR) terminal device, an augmented reality (AR) terminal device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, or the like. A specific technology and a specific device form used by the terminal device are not limited in the embodiment of this application.

For example, the wireless communication system is a long term evolution (LIE) system. In the LTE system, a reference signal sent by the terminal device to the network device may be an SRS, and the network device may perform related measurement based on the SRS to obtain CSI. For example, the network device performs channel quality estimation based on the SRS to obtain CSI. For example, the network device may estimate uplink channel quality by measuring the SRS, to perform uplink AMC and uplink frequency selective scheduling. The network device may further measure uplink timing of the terminal device, deliver a TA command, ensure an uplink synchronization status of the terminal device, and calculate a downlink beamforming weight by using the SRS.

In a plurality of cells, due to signal interference between different cells, SRS interference is severe in an area in which signals of the different cells overlap. Consequently, SRS measurement is inaccurate. Therefore, how to allocate, to the terminal device, a transmission resource for transmitting an SRS plays a decisive role in maintaining uplink synchronization, ensuring uplink frequency selective scheduling, and the like for the terminal device.

Figure 1:
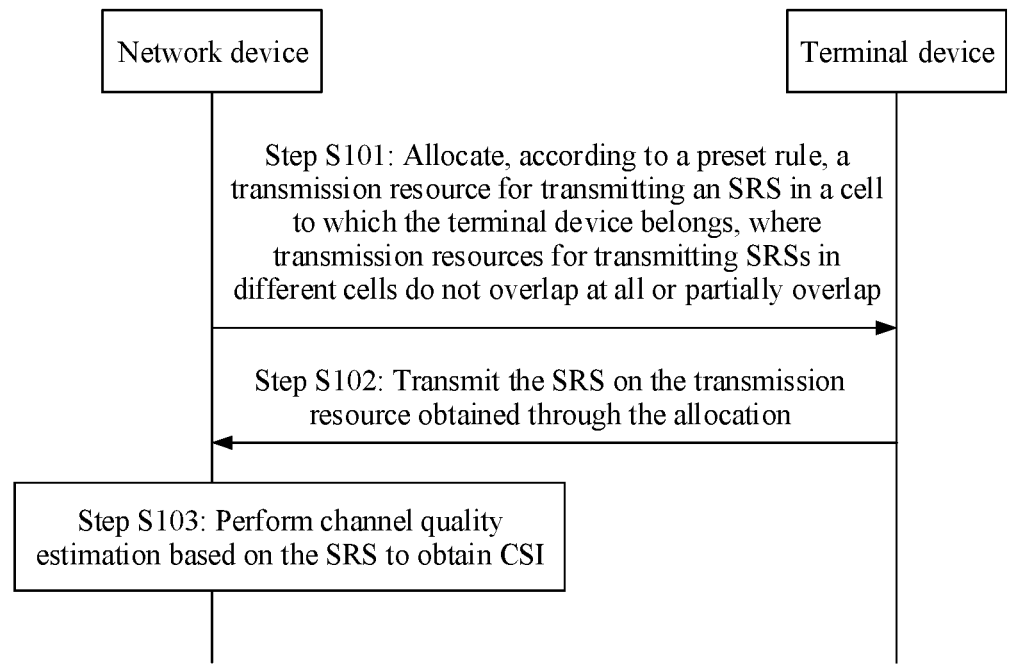
FIG. 1 is a schematic diagram of a method for obtaining channel state information according to an embodiment of this application.

To better understand a method for obtaining channel state information, an apparatus, and a computer storage medium disclosed in the embodiments of this application, the following first describes the method for obtaining channel state information in the embodiments of this application. FIG. 1 is a schematic flowchart of a method for obtaining channel state information according to an embodiment of this application. The method includes but is not limited to the following steps.

Step S101: A network device allocates, to a terminal device according to a preset rule, a transmission resource for transmitting an SRS in a cell to which the terminal device belongs. Transmission resources for transmitting SRSs in different cells do not overlap at all or partially overlap.

The transmission resource includes a time domain resource, a frequency domain resource, a carrier domain resource, or a code domain resource. For example, time domain resources for transmitting the SRSs in the different cells do not completely overlap (for example, terminal devices in the different cells transmit the SRSs on different SRS symbols). For another example, frequency domain resources for transmitting the SRSs in the different cells do not completely overlap (for example, terminal devices in the different cells transmit the SRSs on different sub-bands). For another example, carrier domain resources for transmitting the SRSs in the different cells do not completely overlap (for example, terminal devices in the different cells transmit the SRSs on different subcarriers). For another example, code domain resources for transmitting the SRSs in the different cells do not completely overlap (for example, terminal devices in the different cells transmit the SRSs on different orthogonal codes (Cyclic Shift sequences)). In this embodiment, the terminal device may use all other frequency domain resources, carrier domain resources, or code domain resources in the time domain resources allocated by the network device to the cell to which the terminal device belongs, and does not cause interference to another neighboring cell.

In an implementation, when the allocation is performed according to an SRS time domain (SRS symbol) allocation scheme, the network device allocates, in different subframe SRS resources of an entire frame, different SRS symbol resources to cells having different PCIs. When the allocation is performed according to an SRS resource frequency domain (SRS sub-band) allocation scheme, SRSs in a system bandwidth of the entire cell are divided into different sub-bands. A frequency of a first sub-band is less than a frequency of a second sub-band. The frequency of the second sub-band is less than a frequency of a third sub-band. The frequency of the third sub-band is less than a frequency of a fourth sub-band. A frequency domain relationship between other sub-bands is deduced by analogy. When the allocation is performed according to an SRS carrier domain (SRS Comb) allocation scheme, in carrier domain resources in a system bandwidth of the entire cell, different SRS carrier domain resources are numbered based on physical resource blocks RBs, and system SRS resources are allocated to cells having different PCIs. When the allocation is performed according to an SRS resource code domain (SRS Cyclic Shift sequence) allocation scheme, in SRS code domain resources in a system bandwidth of the entire cell, different SRS code domain resources are numbered based on SRS orthogonal code Cyclic Shift serial numbers, and system SRS resources are allocated to cells having different PCIs.

In an implementation, the time domain resources for transmitting the SRSs in the different cells do not overlap at all or partially overlap. In a part in which the time domain resources for transmitting the SRSs in the different cells completely overlap, frequency domain resources for transmitting the SRSs in the different cells do not overlap at all or partially overlap. In a part in which the frequency domain resources for transmitting the SRSs in the different cells completely overlap, carrier domain resources for transmitting the SRSs in the different cells do not overlap at all or partially overlap. In a part in which the carrier domain resources for transmitting the SRSs in the different cells completely overlap, code domain resources for transmitting the SRSs in the different cells do not overlap at all or partially overlap.

In this embodiment, the terminal device included in each cell may use a part of or all transmission resources in a sub-band range that is allocated by the network device for the cell. If a quantity of access users in the cell is very large and exceeds a sub-band range allocated to the cell, to avoid interference to another cell, subcarriers or code channels on an expanded resource are staggered as much as possible. Based on this, even if a same resource block (RB) is allocated to different cells, subcarriers in the RB allocated to the different cells are staggered as much as possible. Even if a same subcarrier is allocated to different cells, code channels in the subcarrier allocated to the different cells are staggered as much as possible, to reduce inter-cell SRS interference.

In an implementation, the network device may determine a quantity of cells in which the transmission resource needs to be currently allocated, and allocate, to the terminal device based on the quantity of cells, the transmission resource for transmitting the SRS in the cell to which the terminal device belongs. For example, a same SRS allocation algorithm may be used within a cell and between cells to ensure that transmission resources allocated to different cells are staggered as much as possible.

In an implementation, the network device divides a PCI of the cell to which the terminal device belongs by the quantity of cells to obtain a remainder, determines, based on the remainder, the cell to which the terminal device belongs as a target cell, and allocates, to the terminal device, the transmission resource for transmitting the SRS in the target cell. The target cell is a first cell, a second cell, or a third cell. The first cell is a cell for which the remainder obtained by dividing the PCI by the quantity of cells is a first value. The second cell is a cell for which the remainder obtained by dividing the PCI by the quantity of cells is a second value. The third cell is a cell for which the remainder obtained by dividing the PCI by the quantity of cells is a third value. A transmission resource for transmitting an SRS in the first cell, a transmission resource for transmitting an SRS in the second cell, and a transmission resource for transmitting an SRS in the third cell do not overlap at all or partially overlap.

In this embodiment, the network device may group jointly allocated cells into a cell cluster, and formulate a joint allocation principle to jointly allocate transmission resources to a plurality of cells, to reduce SRS interference between different cells as much as possible, and improve transmission resource utilization. For example, in a 3-sector networking scenario, transmission resources in different cells may be staggered according to PCI mod 3. In the jointly allocated cell cluster, different transmission resources are initially allocated in different cells. If a quantity of time domain SRS symbols of a system frame is sufficient for staggering the transmission resources in the different cells, the transmission resources in the different cells are first staggered in time domain (SRS symbol). If the transmission resources in the different cells cannot be staggered in time domain, the transmission resources in the different cells are staggered in frequency domain (SRS sub-band). If the transmission resources in the different cells cannot be staggered in frequency domain, the transmission resources in the different cells are staggered in carrier domain (SRS subcarrier Comb). If the transmission resources in the different cells cannot be staggered in carrier domain, the transmission resources in the different cells are staggered in code domain (SRS orthogonal code).

For example, the quantity of cells is 3. A cell identifier of the first cell is 0. A cell identifier of the second cell is 1. A cell identifier of the third cell is 2. The transmission resource for transmitting the SRS in the first cell is the first subframe to the fourth subframe in the system frame. The transmission resource for transmitting the SRS in the second cell is the fourth subframe to the seventh subframe in the system frame. The transmission resource for transmitting the SRS in the third cell is the seventh subframe to the tenth subframe in the system frame. The network device may obtain the PCI of the cell to which the terminal device belongs. If the remainder obtained by dividing the PCI of the cell to which the terminal device belongs by the quantity of cells is 0, the network device may determine that the cell to which the terminal device belongs is the first cell, and further allocate, to the terminal device, the transmission resource for transmitting the SRS. The allocated transmission resource is the first subframe to the fourth subframe in the system frame.

In an implementation, the network device may determine a quantity of intra-frequency neighboring cells, and allocate, to the terminal device based on the quantity of cells, the transmission resource for transmitting the SRS in the cell to which the terminal device belongs. The intra-frequency neighboring cells include the cell to which the terminal device belongs, and the intra-frequency neighboring cells have a same spectrum.

In an implementation, the network device may divide a PCI of the cell to which the terminal device belongs by the quantity of cells to obtain a remainder, determine, based on the remainder, the cell to which the terminal device belongs as a target cell, and allocate, to the terminal device, the transmission resource for transmitting the SRS in the target cell. The target cell is a first cell, a second cell, or a third cell. The first cell is a cell for which the remainder obtained by dividing the PCI by the quantity of cells is a first value. The second cell is a cell for which the remainder obtained by dividing the PCI by the quantity of cells is a second value. The third cell is a cell for which the remainder obtained by dividing the PCI by the quantity of cells is a third value. A transmission resource for transmitting an SRS in the first cell is a first sub-band or a second sub-band. A transmission resource for transmitting an SRS in the second cell is the second sub-band or a third sub-band. A transmission resource for transmitting an SRS in the third cell is the third sub-band or a fourth sub-band.

For example, if there are three intra-frequency neighboring cells, SRS resource allocation of the three cells may be staggered based on remainders obtained by dividing PCIs of the cells by 3. A cell for which PCI mod 3=0 preferentially uses sub-bands 0 and 1 in a system full band. A cell for which PCI mod 3=1 preferentially uses sub-bands 1 and 2 in a system SRS full-band resource. A cell for which PCI mod 3=2 preferentially uses sub-bands 2 and 3 in the system SRS full-band resource.

In an implementation, the network device divides a physical cell identifier PCI of the cell to which the terminal device belongs by the quantity of cells to obtain a remainder, determines, based on the remainder, the cell to which the terminal device belongs as a target cell, and allocates, to the terminal device, the transmission resource for transmitting the SRS in the target cell. The target cell is a fourth cell or a fifth cell. The fourth cell is a cell for which the remainder obtained by dividing the PCI by the quantity of cells is a first value. The fifth cell is a cell for which the remainder obtained by dividing the PCI by the quantity of cells is a second value. A transmission resource for transmitting an SRS in the fourth cell is a fifth sub-band or a sixth sub-band. A transmission resource for transmitting an SRS in the fifth cell is a seventh sub-band or an eighth sub-band. The fifth sub-band and the seventh sub-band are obtained based on a quantity of frequency domain resources included in the system bandwidth. A frequency of the fifth sub-band is less than a frequency of the seventh sub-band. The sixth sub-band is a part of the fifth sub-band, and the eighth sub-band is a part of the seventh sub-band.

For example, if there are two intra-frequency neighboring cells, SRS resource allocation of the two cells may be staggered based on remainders obtained by dividing PCIDs of the cells by 2. A cell for which PCI mod 2=0 preferentially uses an upper half sub-band or an upper 1/4 sub-band of the system bandwidth. A cell for which PCI mod 2=1 preferentially uses a lower half sub-band or a lower 1/4 sub-band of the system bandwidth.

In an implementation, the network device sends first configuration information to the terminal device, where the first configuration information is used to indicate the terminal device to regularly transmit, based on a configuration periodicity, the SRS on the allocated transmission resource.

In an implementation, the network device sends second configuration information to the terminal device, where the second configuration information is used to indicate that the transmission resource allocated to the terminal device is a resource other than a transmission resource corresponding to a periodically transmitted SRS in the system bandwidth.

In this embodiment, SRS transmission includes periodic SRS transmission and aperiodic SRS transmission based on a user feedback frequency. When the terminal device accesses a network, the network device notifies the terminal device by using signaling. A periodic SRS needs to be sent by the terminal based on the configuration periodicity, and an aperiodic SRS needs to be sent by the terminal based on triggering by the network device.

In an implementation, the periodic SRS and the aperiodic SRS cooperate with each other. The aperiodic SRS may be configured at an SRS sub-band position that is not detected by using the periodic SRS, so that the terminal device can quickly report information about the position that is not detected by using the periodic SRS. When resources are sufficient, the aperiodic SRS can be used to indicate full-band SRS sounding. An aperiodic SRS bandwidth and a frequency hopping bandwidth of a user are allocated based on a size of an RB of a service of the user.

Uplink and downlink scheduling is preferentially performed at a place in which an SRS sounding position is allocated. If there is a burst service to be processed and a volume of the service is heavy, the uplink and downlink scheduling can be performed at a place in which no SRS sounding position is allocated. For example, the network device may schedule the terminal device in a MIMO mode that does not require a BF weight.

If the terminal device supports the aperiodic SRS, the network device may use a data volume prediction manner during scheduling. Based on a case in which an uplink or downlink data volume in an uplink or downlink buffer is very large, a case in which a frequency domain start position or a bandwidth of scheduled data may need to exceed a sub-band position that is originally detected by using the periodic SRS, a frequency domain position that is not detected by using the SRS, or a case in which a time of previous sounding exceeds a validity period, the network device indicates, by using an uplink/downlink scheduling indication (Downlink Control Information, DCI), the terminal to trigger aperiodic reporting, and supplementarily detects a position that is not detected by the terminal by using the periodic SRS.

In an implementation, when a quantity of users included in the cell to which the terminal device belongs or a type of a service that needs to be currently processed by the terminal device changes, the network device dynamically adjusts the transmission resource allocated to the terminal device.

For example, when SRS resources allocated to the cell according to an SRS resource allocation principle are insufficient, the SRS resources may be expanded, that is, allocation is allowed to be performed according to an SRS resource allocation principle of another neighboring cell. For example, after a time domain resource, a frequency domain resource, a carrier domain resource, and a code domain resource of an initially allocated SRS are all allocated in sequence, the SRS is sequentially expanded in time domain, in frequency domain, in carrier domain, and in code domain. For example, if the SRS cannot be expanded in time domain, the SRS is preferentially expanded in a frequency domain sub-band, and then expanded sequentially in carrier domain and in code domain. That is, an SRS frequency domain resource sub-band allocated in another cell is allowed to be used, and expansion may be subsequently performed in carrier domain and in code domain, to ensure that a user accesses a network. In each cell, user SRSs are allocated according to a rule, to stagger the user SRSs as much as possible. To reduce inter-cell SRS interference, an example in which frequency domain SRSs are allocated in a staggering manner is used herein for description and taken as a reference for allocation of SRSs in other domain in a staggering manner.

In this embodiment, due to a change in a type of the service or an increase in the quantity of users in the cell, more transmission resources are needed. When the transmission resource is expanded to an area outside the cell in which the transmission resource is allocated, to avoid interference, expanded areas in different cells need to be staggered as much as possible.

For example, in different cells, transmission resources are staggered in code domain. A subcarrier 0/1 and a code channel 0/1/2/3 in an RB are preferentially allocated in a cell for which PCI mod 3=0. A subcarrier 2/3 and a code channel 4/5/6/7 in the RB are preferentially allocated in a cell for which PCI mod 3=1. A subcarrier 4/5 and a code channel 8/9/10/11 in the RB are preferentially allocated in a cell for which PCI mod 3=2.

Step S102: The terminal device transmits the SRS on the allocated transmission resource.

Step S103: The network device performs channel quality estimation based on the SRS to obtain CSI.

In this embodiment of this application, the transmission resources for transmitting the SRSs in the different cells do not completely overlap, thereby ensuring that the transmission resources allocated by the network device to the different cells are staggered as much as possible. Therefore, SRS interference between the cells can be reduced, and cell performance can be improved.

Figure 2:
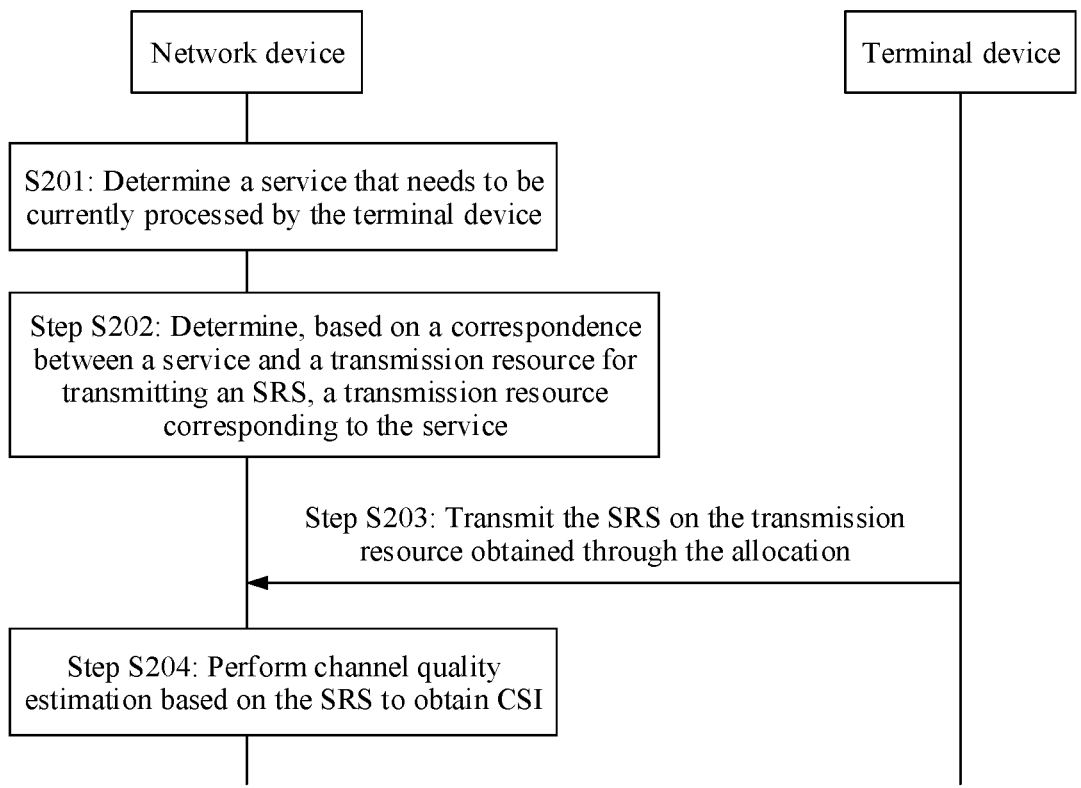
FIG. 2 is another schematic diagram of a method for obtaining channel state information according to an embodiment of this application.

FIG. 2 is another schematic flowchart of a method for obtaining channel state information according to an embodiment of this application. The method includes but is not limited to the following steps.

Step S201: A network device determines a service that needs to be currently processed by a terminal device.

Step S202: The network device determines, based on a correspondence between a service and a transmission resource for transmitting an SRS, a transmission resource corresponding to the service.

In an implementation, the network device may determine, based on indication information of the service that needs to be currently processed by the terminal device, a type of the service, where the indication information includes a QCI or an SPID of the service. The network device may further determine, based on a correspondence between a type of a service and a transmission resource for transmitting an SRS, the transmission resource corresponding to the type of the service. The QCI is a scale value. The QCI (such as a packet loss rate or a packet delay budget) may be used to measure a specific packet forwarding behavior to be provided to a service data flow (SDF). The QCI may further be used for a guaranteed bit rate (GBR) bearer and a non-guaranteed bit rate (Non-GBR) bearer, and is used to specify a control bearer-level packet forwarding manner (such as a scheduling weight, an admission threshold, a queue management threshold, or a link layer protocol configuration) defined in an access node. Based on user information mapped by using the SPID, the network device may use a terminal device-specific camping policy and inter-frequency inter-RAT handover policy, to ensure that the terminal device camps on or is handed over to an appropriate frequency/RAT based on subscription information of the terminal device, thereby ensuring optimal user experience.

In an implementation, when a latency requirement level of the service that needs to be currently processed by the terminal device is greater than a first-level threshold, the network device determines that a configuration periodicity of the SRS is less than a preset periodicity threshold; and when the latency requirement level of the service that needs to be currently processed by the terminal device is less than or equal to the first-level threshold, the network device determines that the configuration periodicity of the SRS is greater than or equal to the preset periodicity threshold.

For example, the network device may determine, based on an indication, such as the QCI or the SPID, of the service, the type of the service that needs to be currently processed by the terminal device. For example, the type of the service may be enhanced machine type communication (eMTC) or a kids watch. Services of different types have different service features. For a service with a small service volume, the transmission resource allocated by the network device may be within a specified range of a full bandwidth. For a service with a large volume and a high delay requirement, the transmission resource allocated by the network device may be a full bandwidth.

In an implementation, the network device determines a service volume based on uplink send buffer data fed back by the terminal device or a downlink send buffer data volume. The network device further determines, based on a correspondence between a service volume and a transmission resource for transmitting an SRS, the transmission resource corresponding to the service volume.

In an implementation, when a frequency domain resource block resource requirement level of the service that needs to be currently processed by the terminal device is less than or equal to a second-level threshold, the network device determines that a sub-band included in the transmission resource is less than or equal to a preset quantity threshold; and when the frequency domain resource block resource requirement level of the service that needs to be currently processed by the terminal device is greater than the second-level threshold, the network device determines that the sub-band included in the transmission resource is greater than or equal to the preset quantity threshold.

For example, when the service volume is large, a transmission resource including a large sub-band (where the large sub-band includes several small sub-bands in frequency domain) may be allocated. When the service volume is small, a transmission resource including a small sub-band may be allocated. For example, services such as semi-persistent voice scheduling and machine-to-machine communication require a relatively small frequency domain resource, and a frequency domain resource corresponding to a transmission resource block size of the service may be allocated.

In an implementation, when the service volume changes, the network device dynamically adjusts the transmission resource allocated to the terminal device. A resource volume of an adjusted transmission resource is directly proportional to the service volume.

For example, if determining that the service volume increases, the network device may adjust a size of a periodic SRS frequency hopping bandwidth by using a radio resource control (RRC) signaling message. For example, the transmission resource allocated to the terminal device is adjusted from a 1/4 full-band frequency hopping bandwidth to a 1/2 full-band frequency hopping bandwidth or a full-band frequency hopping bandwidth.

For another example, when a large SRS sub-band needs to be allocated due to an increase in the service volume, and an SRS frequency-domain transmission resource is idle, the network device may allocate the large SRS sub-band to the terminal device, and may trigger, by using a scheduling indication, reporting of an SRS sub-band with a large aperiodic SRS frequency-domain transmission resource, or reconfigure, by using signaling, an SRS sub-band with a large periodic SRS frequency-domain transmission resource, or even allocate an entire frequency domain sub-band (namely, all frequency domain SRS bandwidths) of the entire cell. When the service volume decreases, a small periodic SRS frequency domain bandwidth may be reconfigured for a user by using signaling.

In this embodiment, an appropriate user SRS frequency-domain transmission resource is adjusted based on the service volume, to obtain a status of a frequency domain channel for transmitting the required service, so that user data can be better transmitted in a downlink or scheduled in an uplink at the frequency domain position. Space domain multiplexing is performed, by using a beamforming (BF) technology and a multiple-input multiple-output (MIMO) technology, on a same time-frequency resource allocated by the network device in the cell.

In an implementation, the network device may further send first configuration information to the terminal device, where the first configuration information is used to indicate the terminal device to regularly transmit, based on a configuration periodicity, the SRS on the allocated transmission resource.

In an implementation, the network device may further send second configuration information to the terminal device, where the second configuration information is used to indicate that the transmission resource allocated to the terminal device is a resource other than a transmission resource corresponding to a periodically transmitted SRS in a system bandwidth.

In an implementation, the network device may dynamically adjust and allocate, based on a service feature, an SRS bandwidth and a periodicity that satisfy a size of a user service bandwidth.

For example, for a latency-sensitive service, the network device may allocate a short SRS periodicity, and for a latency-insensitive service, the network device may allocate a long SRS periodicity.

Step S203: The terminal device transmits the SRS on the allocated transmission resource.

Step S204: The network device performs channel quality estimation based on the SRS to obtain CSI.

In this embodiment of this application, the network device may configure, based on the service feature, the transmission resource required by the service, and sounding does not need to be performed on a transmission resource that is not required by the service, so that the network device and the terminal device can use CSI of an air interface in a more timely manner, and latest channel quality information can be fully used during uplink and downlink scheduling, thereby improving spectral efficiency of the cell. In addition, when a cell bandwidth is larger in a future 5G scenario, a transmission resource required by a service may be allocated to improve resource utilization.

In another method for obtaining channel state information, a smaller frequency domain bandwidth indicates a more similar channel characteristic obtained through SRS sounding than a channel characteristic obtained through SRS sounding by using a larger frequency domain bandwidth. For example, during determining multi-user space domain multiplexing pairing scheduling by using multi-user beamforming of downlink scheduling and uplink virtual MIMO, a channel statistical characteristic is used to calculate a statistical weight. If the user statistical weight can more accurately comply with user channel information, when the statistical weight used during pairing scheduling is closer to an instantaneous weight, selected paired users are more accurate, interference between the paired users is lower, and a cell throughput is higher.

During a scheduling process, a user ensures, in the foregoing manner, that there is corresponding channel information during the scheduling. For example, when some terminal devices do not support an aperiodic SRS, a service whose type is an urgent and burst service or a service whose service volume increases and exceeds an RB allocated for SRS sounding, and scheduling needs to be performed in a current subframe, downlink scheduling may be performed by using statistical channel information, or performed temporarily by using a DCI message in a diversity mode of a common MIMO transmission mode without depending on the channel information, and uplink scheduling may be performed by using the statistical channel information.

In this embodiment, SRS sounding is preferentially performed on the transmission resource allocated by the network device during the uplink and downlink scheduling. When there is a burst service to be processed, the terminal device is allowed to transmit the SRS on a non-allocated transmission resource. In a beamforming transmission mode that requires a channel state, transmitted data may be weighted by using a statistical weight of an allocated SRS frequency-domain transmission resource, and a user in a MIMO mode may directly perform uplink and downlink scheduling transmission in a system full band.

The foregoing describes in detail the methods in the embodiments of this application. The following provides related apparatuses in the embodiments of this application.

Figure 3:
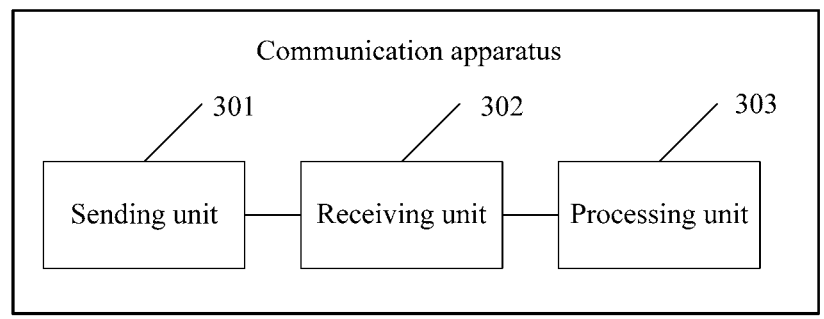
FIG. 3 is a schematic diagram of a communication apparatus according to an embodiment of this application.

FIG. 3 is a schematic diagram of a structure of a communication apparatus according to an embodiment of this application. The communication apparatus is configured to perform the steps performed by the network device in the method embodiment corresponding to FIG. 1. The communication apparatus may include:

a sending unit 301, configured to allocate, to a terminal device according to a preset rule, a transmission resource for transmitting an SRS in a cell to which the terminal device belongs, where transmission resources for transmitting SRSs in different cells do not overlap at all or partially overlap, and the transmission resource includes a time domain resource, a frequency domain resource, a carrier domain resource, or a code domain resource;

a receiving unit 302, configured to receive the SRS transmitted by the terminal device on the allocated transmission resource; and a processing unit 303, configured to perform channel quality estimation based on the received SRS to obtain channel state information CSI.

In an implementation, that a sending unit 301 allocates, to a terminal device according to a preset rule, a transmission resource for transmitting an SRS in a cell to which the terminal device belongs includes:

determining a quantity of cells in which the transmission resource needs to be currently allocated; and allocating, to the terminal device based on the quantity of cells, the transmission resource for transmitting the SRS in the cell to which the terminal device belongs.

In an implementation, that the sending unit 301 allocates, to the terminal device based on the quantity of cells, the transmission resource for transmitting the SRS in the cell to which the terminal device belongs includes:

dividing a physical cell identifier PCI of the cell to which the terminal device belongs by the quantity of cells, to obtain a remainder;

determining, based on the remainder, the cell to which the terminal device belongs as a target cell, where the target cell is a first cell, a second cell, or a third cell; the first cell is a cell for which the remainder obtained by dividing the PCI by the quantity of cells is a first value, the second cell is a cell for which the remainder obtained by dividing the PCI by the quantity of cells is a second value, and the third cell is a cell for which the remainder obtained by dividing the PCI by the quantity of cells is a third value; and a transmission resource for transmitting an SRS in the first cell, a transmission resource for transmitting an SRS in the second cell, and a transmission resource for transmitting an SRS in the third cell do not overlap at all or partially overlap; and allocating, to the terminal device, the transmission resource for transmitting the SRS in the target cell.

In an implementation, that the sending unit 301 determines a quantity of cells in which the transmission resource needs to be currently allocated includes:

determining a quantity of intra-frequency neighboring cells, where the intra-frequency neighboring cells include the cell to which the terminal device belongs, and the intra-frequency neighboring cells have a same spectrum.

In an implementation, that the sending unit 301 allocates, to the terminal device based on the quantity of cells, the transmission resource for transmitting the SRS in the cell to which the terminal device belongs includes:

dividing a PCI of the cell to which the terminal device belongs by the quantity of cells, to obtain a remainder;

determining, based on the remainder, the cell to which the terminal device belongs as a target cell, where the target cell is a first cell, a second cell, or a third cell; the first cell is a cell for which the remainder obtained by dividing the PCI by the quantity of cells is a first value, the second cell is a cell for which the remainder obtained by dividing the PCI by the quantity of cells is a second value, and the third cell is a cell for which the remainder obtained by dividing the PCI by the quantity of cells is a third value; and a transmission resource for transmitting an SRS in the first cell is a first sub-band or a second sub-band, a transmission resource for transmitting an SRS in the second cell is the second sub-band or a third sub-band, and a transmission resource for transmitting an SRS in the third cell is the third sub-band or a fourth sub-band; and allocating, to the terminal device, the transmission resource for transmitting the SRS in the target cell.

In an implementation, that the sending unit 301 allocates, to the terminal device based on the quantity of cells, the transmission resource for transmitting the SRS in the cell to which the terminal device belongs includes:

dividing a physical cell identifier PCI of the cell to which the terminal device belongs by the quantity of cells, to obtain a remainder;

determining, based on the remainder, the cell to which the terminal device belongs as a target cell, where the target cell is a fourth cell or a fifth cell; the fourth cell is a cell for which the remainder obtained by dividing the PCI by the quantity of cells is a first value, and the fifth cell is a cell for which the remainder obtained by dividing the PCI by the quantity of cells is a second value; and a transmission resource for transmitting an SRS in the fourth cell is a fifth sub-band or a sixth sub-band, a transmission resource for transmitting an SRS in the fifth cell is a seventh sub-band or an eighth sub-band, the fifth sub-band and the seventh sub-band are obtained based on a quantity of frequency domain resources included in a system bandwidth, a frequency of the fifth sub-band is less than a frequency of the seventh sub-band, the sixth sub-band is a part of the fifth sub-band, and the eighth sub-band is a part of the seventh sub-band; and allocating, to the terminal device, the transmission resource for transmitting the SRS in the target cell.

In an implementation, that transmission resources for transmitting SRSs in different cells do not overlap at all or partially overlap includes:

time domain resources for transmitting the SRSs in the different cells do not overlap at all or partially overlap;

in a part in which the time domain resources for transmitting the SRSs in the different cells completely overlap, frequency domain resources for transmitting the SRSs in the different cells do not overlap at all or partially overlap;

in a part in which the frequency domain resources for transmitting the SRSs in the different cells completely overlap, carrier domain resources for transmitting the SRSs in the different cells do not overlap at all or partially overlap; and in a part in which the carrier domain resources for transmitting the SRSs in the different cells completely overlap, code domain resources for transmitting the SRSs in the different cells do not overlap at all or partially overlap.

In an implementation, the sending unit 301 is further configured to send first configuration information to the terminal device, where the first configuration information is used to indicate the terminal device to regularly transmit, based on a configuration periodicity, the SRS on the allocated transmission resource.

In an implementation, the sending unit 301 is further configured to send second configuration information to the terminal device, where the second configuration information is used to indicate that the transmission resource allocated to the terminal device is a resource other than a transmission resource corresponding to a periodically transmitted SRS in the system bandwidth.

In an implementation, the processing unit 303 is further configured to: when a quantity of users included in the cell to which the terminal device belongs or a type of a service that needs to be currently processed by the terminal device changes, dynamically adjust the transmission resource allocated to the terminal device.

It should be noted that, for content that is not mentioned in the embodiment corresponding to FIG. 3 and a specific implementation of steps performed by the units, refer to the embodiment shown in FIG. 1 and the foregoing content. Details are not described herein again.

FIG. 3 is a schematic diagram of a structure of a communication apparatus according to an embodiment of this application. The communication apparatus is configured to perform the steps performed by the network device in the method embodiment corresponding to FIG. 2. The communication apparatus may include:

a processing unit 303, configured to determine a service that needs to be currently processed by a terminal device, where the processing unit 303 is further configured to determine, based on a correspondence between a service and a transmission resource for transmitting a sounding reference signal SRS, a transmission resource corresponding to the service;

a sending unit 301, configured to allocate the transmission resource to the terminal device; and a receiving unit 302, configured to receive the SRS transmitted by the terminal device on the allocated transmission resource, where the processing unit 303, further configured to perform channel quality estimation based on the received SRS to obtain channel state information CSI.

In an implementation, that the processing unit 303 determines, based on a correspondence between a service and a transmission resource for transmitting an SRS, a transmission resource corresponding to the service includes:

determining, based on indication information of the service that needs to be currently processed by the terminal device, a type of the service, where the indication information includes a quality of service class identifier QCI or a subscriber profile identifier SPID of the service; and determining, based on a correspondence between a type of a service and a transmission resource for transmitting an SRS, the transmission resource corresponding to the type of the service.

In an implementation, that the processing unit 303 determines, based on a correspondence between a type of a service and a transmission resource for transmitting an SRS, the transmission resource corresponding to the type of the service includes:

when a latency requirement level of the service that needs to be currently processed by the terminal device is greater than a first-level threshold, determining, by the network device, that a configuration periodicity of the SRS is less than a preset periodicity threshold; and when the latency requirement level of the service that needs to be currently processed by the terminal device is less than or equal to the first-level threshold, determining that the configuration periodicity of the SRS is greater than or equal to the preset periodicity threshold.

In an implementation, that the processing unit 303 determines, based on a correspondence between a service and a transmission resource for transmitting a sounding reference signal SRS, a transmission resource corresponding to the service includes:

determining a service volume based on uplink send buffer data fed back by the terminal device or a downlink send buffer data volume; and determining, based on a correspondence between a service volume and a transmission resource for transmitting an SRS, the transmission resource corresponding to the service volume.

In an implementation, that the processing unit 303 determines, based on a correspondence between a service volume and a transmission resource for transmitting an SRS, the transmission resource corresponding to the service volume includes:

when a frequency domain resource block resource requirement level of the service that needs to be currently processed by the terminal device is less than or equal to a second-level threshold, determining that a sub-band included in the transmission resource is less than or equal to a preset quantity threshold; and when the frequency domain resource block resource requirement level of the service that needs to be currently processed by the terminal device is greater than the second-level threshold, determining that the sub-band included in the transmission resource is greater than or equal to the preset quantity threshold.

In an implementation, the processing unit 303 is further configured to: when the service volume changes, dynamically adjust the transmission resource allocated to the terminal device. A resource volume of an adjusted transmission resource is directly proportional to the service volume.

In an implementation, the sending unit 301 is further configured to send first configuration information to the terminal device, where the first configuration information is used to indicate the terminal device to regularly transmit, based on a configuration periodicity, the SRS on the allocated transmission resource.

In an implementation, the sending unit 301 is further configured to send second configuration information to the terminal device, where the second configuration information is used to indicate that the transmission resource allocated to the terminal device is a resource other than a transmission resource corresponding to a periodically transmitted SRS in a system bandwidth.

It should be noted that, for content that is not mentioned in the embodiment corresponding to FIG. 3 and a specific implementation of steps performed by the units, refer to the embodiment shown in FIG. 2 and the foregoing content. Details are not described herein again.

Figure 4:
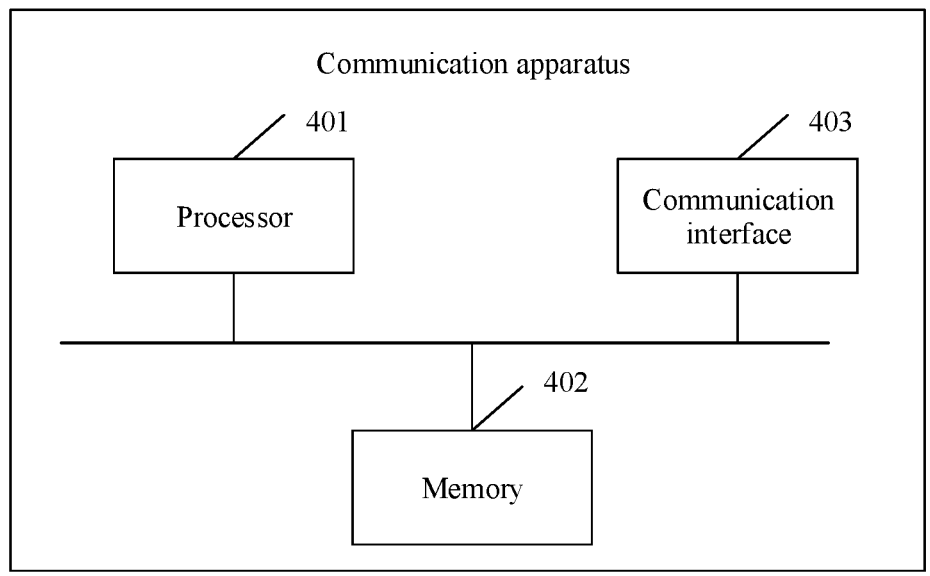
FIG. 4 is another schematic diagram of a communication apparatus according to an embodiment of this application.

In an implementation, related functions implemented by the units in FIG. 4 may be implemented in combination with a processor and a communication interface. FIG. 4 is a schematic diagram of a structure of a communication apparatus according to an embodiment of the present invention. The communication apparatus includes a processor 401, a memory 402, and a communication interface 403. The processor 401, the memory 402, and the communication interface 403 are connected through one or more communication buses.

The processor 401 is configured to support the communication apparatus in performing the method in FIG. 1. The processor 401 may be a central processing unit (CPU), a network processor (NP), a hardware chip, or any combination thereof.

The memory 402 is configured to store program code or the like. The memory 402 may include a volatile memory, for example, a random access memory (RAM). The memory 402 may also include a non-volatile memory, for example, a read-only memory (ROM), a flash memory, a hard disk drive (HDD), or a solid-state drive (SSD). The memory 402 may further include a combination of the foregoing types of memories.

The communication interface 403 is configured to send and receive data.

In this embodiment of the present invention, the communication apparatus includes a plurality of communication interfaces, and a communication interface configured to send data and a communication interface configured to receive data may be different communication interfaces.

The processor 401 may invoke the program code stored in the memory 402, to perform the following operations:

allocating, through the communication interface 403, to a terminal device according to a preset rule, a transmission resource for transmitting a sounding reference signal SRS in a cell to which the terminal device belongs, where transmission resources for transmitting SRSs in different cells do not overlap at all or partially overlap, and the transmission resource includes a time domain resource, a frequency domain resource, a carrier domain resource, or a code domain resource;

receiving, through the communication interface 403, the SRS transmitted by the terminal device on the allocated transmission resource; and performing channel quality estimation based on the received SRS to obtain channel state information CSI.

In an implementation, that the processor 401 allocates, through the communication interface 403, to a terminal device according to a preset rule, a transmission resource for transmitting an SRS in a cell to which the terminal device belongs includes:

determining a quantity of cells in which the transmission resource needs to be currently allocated; and allocating, to the terminal device based on the quantity of cells, the transmission resource for transmitting the SRS in the cell to which the terminal device belongs.

In an implementation, that the processor 401 allocates, through the communication interface 403, to the terminal device based on the quantity of cells, the transmission resource for transmitting the SRS in the cell to which the terminal device belongs includes:

dividing a physical cell identifier PCI of the cell to which the terminal device belongs by the quantity of cells, to obtain a remainder;

determining, based on the remainder, the cell to which the terminal device belongs as a target cell, where the target cell is a first cell, a second cell, or a third cell; the first cell is a cell for which the remainder obtained by dividing the PCI by the quantity of cells is a first value, the second cell is a cell for which the remainder obtained by dividing the PCI by the quantity of cells is a second value, and the third cell is a cell for which the remainder obtained by dividing the PCI by the quantity of cells is a third value; and a transmission resource for transmitting an SRS in the first cell, a transmission resource for transmitting an SRS in the second cell, and a transmission resource for transmitting an SRS in the third cell do not overlap at all or partially overlap; and allocating, to the terminal device, the transmission resource for transmitting the SRS in the target cell.

In an implementation, that the processor 401 determines a quantity of cells in which the transmission resource needs to be currently allocated includes:

determining a quantity of intra-frequency neighboring cells, where the intra-frequency neighboring cells include the cell to which the terminal device belongs, and the intra-frequency neighboring cells have a same spectrum.

In an implementation, the allocating, by the processor 401 to the terminal device based on the quantity of cells, the transmission resource for transmitting the SRS in the cell to which the terminal device belongs through the communication interface 403 includes:

dividing a PCI of the cell to which the terminal device belongs by the quantity of cells, to obtain a remainder;

determining, based on the remainder, the cell to which the terminal device belongs as a target cell, where the target cell is a first cell, a second cell, or a third cell; the first cell is a cell for which the remainder obtained by dividing the PCI by the quantity of cells is a first value, the second cell is a cell for which the remainder obtained by dividing the PCI by the quantity of cells is a second value, and the third cell is a cell for which the remainder obtained by dividing the PCI by the quantity of cells is a third value; and a transmission resource for transmitting an SRS in the first cell is a first sub-band or a second sub-band, a transmission resource for transmitting an SRS in the second cell is the second sub-band or a third sub-band, and a transmission resource for transmitting an SRS in the third cell is the third sub-band or a fourth sub-band; and allocating, to the terminal device, the transmission resource for transmitting the SRS in the target cell.

In an implementation, the allocating, by the processor 401 to the terminal device based on the quantity of cells, the transmission resource for transmitting the SRS in the cell to which the terminal device belongs through the communication interface 403 includes:

dividing a physical cell identifier PCI of the cell to which the terminal device belongs by the quantity of cells, to obtain a remainder;

determining, based on the remainder, the cell to which the terminal device belongs as a target cell, where the target cell is a fourth cell or a fifth cell; the fourth cell is a cell for which the remainder obtained by dividing the PCI by the quantity of cells is a first value, and the fifth cell is a cell for which the remainder obtained by dividing the PCI by the quantity of cells is a second value; and a transmission resource for transmitting an SRS in the fourth cell is a fifth sub-band or a sixth sub-band, a transmission resource for transmitting an SRS in the fifth cell is a seventh sub-band or an eighth sub-band, the fifth sub-band and the seventh sub-band are obtained based on a quantity of frequency domain resources included in a system bandwidth, a frequency of the fifth sub-band is less than a frequency of the seventh sub-band, the sixth sub-band is a part of the fifth sub-band, and the eighth sub-band is a part of the seventh sub-band; and allocating, to the terminal device, the transmission resource for transmitting the SRS in the target cell.

In an implementation, that transmission resources for transmitting SRSs in different cells do not overlap at all or partially overlap includes:

time domain resources for transmitting the SRSs in the different cells do not overlap at all or partially overlap;

in a part in which the time domain resources for transmitting the SRSs in the different cells completely overlap, frequency domain resources for transmitting the SRSs in the different cells do not overlap at all or partially overlap;

in a part in which the frequency domain resources for transmitting the SRSs in the different cells completely overlap, carrier domain resources for transmitting the SRSs in the different cells do not overlap at all or partially overlap; and in a part in which the carrier domain resources for transmitting the SRSs in the different cells completely overlap, code domain resources for transmitting the SRSs in the different cells do not overlap at all or partially overlap.

In an implementation, the processor 401 may further perform the following operation through the communication interface 403:
  sending first configuration information to the terminal device, where the first configuration information is used to indicate the terminal device to regularly transmit, based on a configuration periodicity, the SRS on the allocated transmission resource.

In an implementation, the processor 401 may further perform the following operation through the communication interface 403:
  sending second configuration information to the terminal device, where the second configuration information is used to indicate that the transmission resource allocated to the terminal device is a resource other than a transmission resource corresponding to a periodically transmitted SRS in the system bandwidth.

In an implementation, the processor 401 may further perform the following operation:
  when a quantity of users included in the cell to which the terminal device belongs or a type of a service that needs to be currently processed by the terminal device changes, dynamically adjusting the transmission resource allocated to the terminal device.

It should be noted that, for content that is not mentioned in the embodiment corresponding to FIG. 4 and a specific implementation of steps performed by the components, refer to the embodiment shown in FIG. 1 and the foregoing content. Details are not described herein again.

In an implementation, the processor 401 is configured to support the communication apparatus in performing the method in FIG. 2. The processor 401 may invoke the program code stored in the memory 402, to perform the following operations:
  determining a service that needs to be currently processed by a terminal device;
  determining, based on a correspondence between a service and a transmission resource for transmitting a sounding reference signal SRS, a transmission resource corresponding to the service;
  allocating the transmission resource to the terminal device through the communication interface 403; and
  receiving, through the communication interface 403, the SRS transmitted by the terminal device on the allocated transmission resource; and
  performing channel quality estimation based on the received SRS to obtain channel state information CSI.

In an implementation, that the processor 401 determines, based on a correspondence between a service and a transmission resource for transmitting an SRS, a transmission resource corresponding to the service includes:
  determining, based on indication information of the service that needs to be currently processed by the terminal device, a type of the service, where the indication information includes a quality of service class identifier QCI or a subscriber profile identifier SPID of the service; and
  determining, based on a correspondence between a type of a service and a transmission resource for transmitting an SRS, the transmission resource corresponding to the type of the service.

In an implementation, the determining, by the processor 401 based on a correspondence between a type of a service and a transmission resource for transmitting an SRS, the transmission resource corresponding to the type of the service includes:
  when a latency requirement level of the service that needs to be currently processed by the terminal device is greater than a first-level threshold, determining that a configuration periodicity of the SRS is less than a preset periodicity threshold; and
  when the latency requirement level of the service that needs to be currently processed by the terminal device is less than or equal to the first-level threshold, determining that the configuration periodicity of the SRS is greater than or equal to the preset periodicity threshold.

In an implementation, that the processor 401 determines, based on a correspondence between a service and a transmission resource for transmitting a sounding reference signal SRS, a transmission resource corresponding to the service includes:
  determining a service volume based on uplink send buffer data fed back by the terminal device or a downlink send buffer data volume; and
  determining based on a correspondence between a service volume and a transmission resource for transmitting an SRS, the transmission resource corresponding to the service volume.

In an implementation, that the processor 401 determines, based on a correspondence between a service volume and a transmission resource for transmitting an SRS, the transmission resource corresponding to the service volume includes:
  when a frequency domain resource block resource requirement level of the service that needs to be currently processed by the terminal device is less than or equal to a second-level threshold, determining that a sub-band included in the transmission resource is less than or equal to a preset quantity threshold; and
  when the frequency domain resource block resource requirement level of the service that needs to be currently processed by the terminal device is greater than the second-level threshold, determining that the sub-band included in the transmission resource is greater than or equal to the preset quantity threshold.

In an implementation, the processor 401 may further perform the following operation:
  when the service volume changes, dynamically adjusting the transmission resource allocated to the terminal device. A resource volume of an adjusted transmission resource is directly proportional to the service volume.

In an implementation, the processor 401 may further perform the following operation through the communication interface 403:
  sending first configuration information to the terminal device, where the first configuration information is used to indicate the terminal device to regularly transmit, based on a configuration periodicity, the SRS on the allocated transmission resource.

In an implementation, the processor 401 may further perform the following operation through the communication interface 403:
  sending second configuration information to the terminal device, where the second configuration information is used to indicate that the transmission resource allocated to the terminal device is a resource other than a transmission resource corresponding to a periodically transmitted SRS in a system bandwidth.

It should be noted that, for content that is not mentioned in the embodiment corresponding to FIG. 4 and a specific implementation of steps performed by the components, refer to the embodiment shown in FIG. 2 and the foregoing content. Details are not described herein again.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for obtaining channel state information (CSI), wherein the method comprises:
    allocating, by a network device to a terminal device according to a preset rule, a transmission resource for transmitting a sounding reference signal (SRS) in a cell to which the terminal device belongs, wherein the preset rule includes allocating SRS transmission resources based on cell quantity, wherein transmission resources for transmitting SRSs in different cells do not overlap at all or partially overlap, and wherein the transmission resource comprises a time domain resource, a frequency domain resource, a carrier domain resource, or a code domain resource;
    receiving, by the network device, the SRS transmitted by the terminal device on the allocated transmission resource; and
    performing, by the network device, channel quality estimation based on the received SRS to obtain CSI.

2. The method according to claim 1, wherein allocating, by the network device to the terminal device according to the preset rule, the transmission resource for transmitting the SRS in the cell to which the terminal device belongs comprises:
    determining, by the network device, a quantity of cells in which the transmission resource needs to be currently allocated; and
    allocating, by the network device to the terminal device based on the quantity of cells, the transmission resource for transmitting the SRS in the cell to which the terminal device belongs.

3. The method according to claim 2, wherein allocating, by the network device to the terminal device based on the quantity of cells, the transmission resource for transmitting the SRS in the cell to which the terminal device belongs comprises:
    dividing, by the network device, a physical cell identifier (PCI) of the cell to which the terminal device belongs by the quantity of cells to obtain a remainder;
    determining, by the network device based on the remainder, the cell to which the terminal device belongs as a target cell, wherein the target cell is a first cell, a second cell, or a third cell, wherein the first cell is a cell for which the remainder obtained by dividing the PCI by the quantity of cells is a first value, wherein the second cell is a cell for which the remainder obtained by dividing the PCI by the quantity of cells is a second value, wherein the third cell is a cell for which the remainder obtained by dividing the PCI by the quantity of cells is a third value, and wherein a transmission resource for transmitting an SRS in the first cell, a transmission resource for transmitting an SRS in the second cell, and a transmission resource for transmitting an SRS in the third cell do not overlap at all or partially overlap; and
    allocating, by the network device to the terminal device, the transmission resource for transmitting the SRS in the target cell.

4. The method according to claim 2, wherein determining, by the network device, the quantity of cells in which the transmission resource needs to be currently allocated comprises:
    determining, by the network device, a quantity of intra-frequency neighboring cells, wherein the intra-frequency neighboring cells comprise the cell to which the terminal device belongs, and wherein the intra-frequency neighboring cells have a same spectrum.

5. The method according to claim 4, wherein allocating, by the network device to the terminal device based on the quantity of cells, the transmission resource for transmitting the SRS in the cell to which the terminal device belongs comprises:
    dividing, by the network device, a physical cell identifier (PCI) of the cell to which the terminal device belongs by the quantity of cells to obtain a remainder;
    determining, by the network device based on the remainder, the cell to which the terminal device belongs as a target cell, wherein the target cell is a first cell, a second cell, or a third cell, wherein the first cell is a cell for which the remainder obtained by dividing the PCI by the quantity of cells is a first value, wherein the second cell is a cell for which the remainder obtained by dividing the PCI by the quantity of cells is a second value, wherein the third cell is a cell for which the remainder obtained by dividing the PCI by the quantity of cells is a third value, wherein a transmission resource for transmitting an SRS in the first cell is a first sub-band or a second sub-band, wherein a transmission resource for transmitting an SRS in the second cell is the second sub-band or a third sub-band, and wherein a transmission resource for transmitting an SRS in the third cell is the third sub-band or a fourth sub-band; and
    allocating, by the network device to the terminal device, the transmission resource for transmitting the SRS in the target cell.

6. The method according to claim 4, wherein allocating, by the network device to the terminal device based on the quantity of cells, the transmission resource for transmitting the SRS in the cell to which the terminal device belongs comprises:
    dividing, by the network device, a physical cell identifier (PCI) of the cell to which the terminal device belongs by the quantity of cells to obtain a remainder;
    determining, by the network device based on the remainder, the cell to which the terminal device belongs as a target cell, wherein the target cell is a fourth cell or a fifth cell, wherein the fourth cell is a cell for which the remainder obtained by dividing the PCI by the quantity of cells is a first value, wherein the fifth cell is a cell for which the remainder obtained by dividing the PCI by the quantity of cells is a second value, wherein a transmission resource for transmitting an SRS in the fourth cell is a fifth sub-band or a sixth sub-band, wherein a transmission resource for transmitting an SRS in the fifth cell is a seventh sub-band or an eighth sub-band, wherein the fifth sub-band and the seventh sub-band are obtained based on a quantity of frequency domain resources comprised in a system bandwidth, wherein a frequency of the fifth sub-band is less than a frequency of the seventh sub-band, wherein the sixth sub-band is a part of the fifth sub-band, and wherein the eighth sub-band is a part of the seventh sub-band; and allocating, by the network device to the terminal device, the transmission resource for transmitting the SRS in the target cell.

7. The method according to claim 1, wherein that transmission resources for transmitting SRSs in different cells do not overlap at all or partially overlap comprises:

time domain resources for transmitting the SRSs in the different cells do not overlap at all or partially overlap;

in a part in which the time domain resources for transmitting the SRSs in the different cells completely overlap, frequency domain resources for transmitting the SRSs in the different cells do not overlap at all or partially overlap;

in a part in which the frequency domain resources for transmitting the SRSs in the different cells completely overlap, carrier domain resources for transmitting the SRSs in the different cells do not overlap at all or partially overlap; and in a part in which the carrier domain resources for transmitting the SRSs in the different cells completely overlap, code domain resources for transmitting the SRSs in the different cells do not overlap at all or partially overlap.

8. The method according to claim 1, wherein the method further comprises:

sending, by the network device, first configuration information to the terminal device, wherein the first configuration information is used to indicate the terminal device to regularly transmit, based on a configuration periodicity, the SRS on the allocated transmission resource.

9. The method according to claim 1, wherein the method further comprises:

sending, by the network device, second configuration information to the terminal device, wherein the second configuration information is used to indicate that the transmission resource allocated to the terminal device is a resource other than a transmission resource corresponding to a periodically transmitted SRS in a system bandwidth.

10. The method according to claim 1, wherein the method further comprises:

when a quantity of users comprised in the cell to which the terminal device belongs or a type of a service that needs to be currently processed by the terminal device changes, dynamically adjusting, by the network device, the transmission resource allocated to the terminal device.

11. A communication apparatus, comprising:
at least one processor; and
one or more memories coupled to the at least one processor and storing programming instructions for execution by the at least one processor to perform operations comprising:

allocating, to a terminal device according to a preset rule, a transmission resource for transmitting a sounding reference signal (SRS) in a cell to which the terminal device belongs, wherein the preset rule includes allocating SRS transmission resources based on cell quantity, wherein transmission resources for transmitting SRSs in different cells do not overlap at all or partially overlap, and wherein the transmission resource comprises a time domain resource, a frequency domain resource, a carrier domain resource, or a code domain resource;

receiving, the SRS transmitted by the terminal device on the allocated transmission resource; and performing, channel quality estimation based on the received SRS to obtain channel state information (CSI).

12. A communication apparatus, comprising:
at least one processor; and
one or more memories coupled to the at least one processor and storing programming instructions for execution by the at least one processor to perform operations comprising:

determining a service that needs to be currently processed by a terminal device;

determining, based on a correspondence between a service and a transmission resource for transmitting a sounding reference signal (SRS), a transmission resource corresponding to the service;

allocating the transmission resource to the terminal device;

receiving the SRS transmitted by the terminal device on the allocated transmission resource; and performing channel quality estimation based on the received SRS to obtain channel state information (CSI).

13. The communication apparatus according to claim 12, wherein determining, based on the correspondence between a service and a transmission resource for transmitting an SRS, the transmission resource corresponding to the service comprises:

determining, based on indication information of the service that needs to be currently processed by the terminal device, a type of the service, wherein the indication information comprises a quality of service class identifier (QCI) or a subscriber profile identifier (SPID) of the service; and determining, based on a correspondence between a type of a service and a transmission resource for transmitting an SRS, the transmission resource corresponding to the type of the service.

14. The communication apparatus according to claim 13, wherein determining, based on the correspondence between a type of a service and a transmission resource for transmitting an SRS, the transmission resource corresponding to the type of the service comprises:

when a latency requirement level of the service that needs to be currently processed by the terminal device is greater than a first-level threshold, determining that a configuration periodicity of the SRS is less than a preset periodicity threshold; and when the latency requirement level of the service that needs to be currently processed by the terminal device is less than or equal to the first-level threshold, determining that the configuration periodicity of the SRS is greater than or equal to the preset periodicity threshold.

15. The communication apparatus according to claim 12, wherein determining, based on the correspondence between a service and a transmission resource for transmitting an SRS, the transmission resource corresponding to the service comprises:

determining, based on uplink send buffer data volume fed back by the terminal device or a downlink send buffer data volume, a service volume; and determining, based on a correspondence between a service volume and a transmission resource for transmitting an SRS, the transmission resource corresponding to the service volume.

16. The communication apparatus according to claim 15, wherein determining, based on the correspondence between a service volume and a transmission resource for transmitting an SRS, the transmission resource corresponding to the service volume comprises:
- when a frequency domain resource block resource requirement level of the service that needs to be currently processed by the terminal device is less than or equal to a second-level threshold, determining that a sub-band comprised in the transmission resource is less than or equal to a preset quantity threshold; and
- when the frequency domain resource block resource requirement level of the service that needs to be currently processed by the terminal device is greater than the second-level threshold, determining that the sub-band comprised in the transmission resource is greater than or equal to the preset quantity threshold.

17. The communication apparatus according to claim 12, wherein the operations further comprise:
- when a service volume changes, dynamically adjusting the transmission resource allocated to the terminal device, wherein a resource volume of an adjusted transmission resource is directly proportional to the service volume.

18. The communication apparatus according to claim 12, wherein the operations further comprise:
- sending first configuration information to the terminal device, wherein the first configuration information is used to indicate the terminal device to regularly transmit, based on a configuration periodicity, the SRS on the allocated transmission resource.

19. The communication apparatus according to claim 12, wherein operations further comprise:
- sending second configuration information to the terminal device, wherein the second configuration information is used to indicate that the transmission resource allocated to the terminal device is a resource other than a transmission resource corresponding to a periodically transmitted SRS in a system bandwidth.

* * * * *